United States Patent
Fischer et al.

(10) Patent No.: US 7,449,648 B2
(45) Date of Patent: Nov. 11, 2008

(54) DEVICE AND METHOD FOR RECOGNIZING THE OCCUPANCY OF A SEAT

(75) Inventors: Thomas Fischer, Wenden (DE); Ludger Oel, Geseke (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/250,174

(22) Filed: Oct. 13, 2005

(65) Prior Publication Data

US 2006/0108168 A1 May 25, 2006

(30) Foreign Application Priority Data

Nov. 25, 2004 (EP) ................... 04028006

(51) Int. Cl.
*H01H 3/14* (2006.01)
(52) U.S. Cl. .................. 200/85 R; 200/85 A
(58) Field of Classification Search .......... 200/85 R, 200/85 A; 180/273; 280/735; 340/666, 340/426.25, 667; 701/29, 45, 49
See application file for complete search history.

(56) References Cited

U.S. PATENT DOCUMENTS

| | | | | |
|---|---|---|---|---|
| 5,612,876 A | 3/1997 | Zeidler et al. | ......... | 364/424.055 |
| 6,297,743 B1* | 10/2001 | Heller | ......... | 340/665 |
| 6,476,514 B1* | 11/2002 | Schondorf | ......... | 307/10.1 |
| 6,509,747 B2* | 1/2003 | Nagai et al. | ......... | 324/687 |
| 6,689,974 B2* | 2/2004 | Guillot | ......... | 200/85 A |
| 6,816,077 B1* | 11/2004 | Shieh et al. | ......... | 340/602 |
| 6,918,612 B2* | 7/2005 | Smith et al. | ......... | 280/735 |
| 7,039,514 B2* | 5/2006 | Fortune | ......... | 701/45 |
| 7,053,759 B2* | 5/2006 | Kennedy et al. | ......... | 340/438 |
| 7,079,016 B2* | 7/2006 | Ho et al. | ......... | 340/426.25 |
| 2004/0212180 A1 | 10/2004 | Strutz et al. | ......... | 280/735 |

FOREIGN PATENT DOCUMENTS

WO   03/004318 SA   1/2003

OTHER PUBLICATIONS

EP 04 02 8006, European Search Report Dated Apr. 18, 2005.

* cited by examiner

*Primary Examiner*—Michael A. Friedhofer
(74) *Attorney, Agent, or Firm*—Jimmy L. Funke

(57) ABSTRACT

A device and a method for recognizing the occupancy of a seat has two sensor mats which independently of one another detect the pressure exerted on them.

15 Claims, 2 Drawing Sheets

DEVICE AND METHOD FOR RECOGNIZING THE OCCUPANCY OF A SEAT

TECHNICAL FIELD

The present invention relates to a device and a method for recognizing the occupancy of a seat, in particular a motor vehicle seat, in which for detecting a force acting on the seat surface a sensor installation is provided so that the force can be classified for recognition. By classification here is meant that the device should contribute to making a distinction as to who is in fact located on the seat so that components of the vehicle safety system, such as an air bag or belt tightener for example, can be adaptively controlled.

BACKGROUND OF THE INVENTION

Devices of the type identified at the outset are generally well known. In these the sensor installation can be constructed as a sensor mat filled with a fluid, wherein recognition of the seat occupancy ensues by determining the increase in the fluid pressure in the sensor mat when the seat is acted upon by a certain weight.

Since the signals output from the sensor installation do not suffice for classification, in known devices signals from belt tension sensors and acceleration sensors are additionally recorded.

SUMMARY OF THE INVENTION

It is an object of the invention to refine a device and a method of the type identified at the outset in such a way that signal evaluation is made easier.

This task is solved by the characteristics of the independent claims and in particular in that the sensor installation in the device comprises two sensor mats which each independently of one another detect the pressure exerted on them.

By increasing the signal sources from the seat, that is to say the number of sensor mats, it is possible when the mats are of suitable shape reliably to detect and classify the seat occupancy. The need of additionally measuring the belt tension or acceleration is then eliminated.

Advantageous embodiments of the invention are described in the description, the drawing and the subsidiary claims.

According to an advantageous embodiment one of the sensor mats can be shaped so that it is suitable for detecting a child's seat provided with two runners. For this purpose it can also be advantageous for the two sensor mats to be interlocked in one another since by this means selective evaluation of the pressure exerted on the sensor mats is possible.

According to another advantageous embodiment viewed in plan view one sensor mat is located inside the other sensor mat. This allows ready discrimination as to whether, for example, a child's seat or an adult is located on the seat or whether, for example, an adult of small size or low weight or alternatively an adult of average or high weight is sitting on the vehicle seat.

It is furthermore advantageous for one of the sensor mats to be of such a shape that it is suitable for emitting signals which on their own can serve to detect the state that a person belonging either to the 5% lightest or 5% heaviest of their gender is sitting on the seat. Accordingly, the shaping of the mats takes into account differing weight distributions in differently shaped buttocks in humans.

The recognition of the occupancy of the seat can be optimised by detailed specification of the shape of the sensor mats. Accordingly, it is advantageous for an inner mat having a substantially closed surface area to be surrounded by an outer mat in semicircular or U-shaped manner. Relatively heavy adult occupants are also larger and by acting on the outer mat with their weight are distinguishable in this way.

Advantageously, the inner mat is substantially rectangular and possesses two arms as extensions of two opposite sides of the rectangle which project into the interior of the outer mat, ie they are oriented towards the base of the U.

Particularly high sensitivity and differentiability is obtained when a projection on the outer mat juts out in between the two arms. This can be triangular, trapezoidal or semicircular.

Furthermore, trials have shown that the legs of the U-shape of the outer mat need not be of the same width everywhere, but rather that particularly good selectivity is achieved by the legs being wider at those points where they are adjacent to the arms of the inner mat than at those points where they are adjacent to the rectangular shape of the inner mat. It is also particularly advantageous if the legs of the outer mat have recesses on their inner sides adjacent to the rectangular section of the inner mat since by this means different hipbone shapes can be differentiated particularly well.

It is advantageous for the outer sensor mat to have approximately 1.5 to 2.5 times the area, preferably slightly more than twice the area, of the inner sensor mat, that is to say approximately 2 to 2.25 times the area of the inner mat. At its widest point the U-shape can be up 2.5 times the width of the rectangle and also at the end of the legs is preferably more than twice the width of the rectangle. In length it can slightly exceed twice the length of the rectangle (without the arms being taken into account).

The invention also relates to a method for recognizing the occupancy of a seat in which two sensor mats located in the seat each emit a pressure signal and the pressure signals are individually evaluated or sums and differences are also calculated and likewise used for evaluation. When the sensor mat has a suitable shape the signal from an inner mat and the sum of its signal with that from a surrounding U-shaped outer mat is sufficient.

BRIEF DESCRIPTION OF THE INVENTION

The invention is described below purely by way of example on the basis of an advantageous embodiment and with reference to the drawing. The latter shows:

DESCRIPTION OF THE PREFERRED EMBODIMENT

Figure 1:
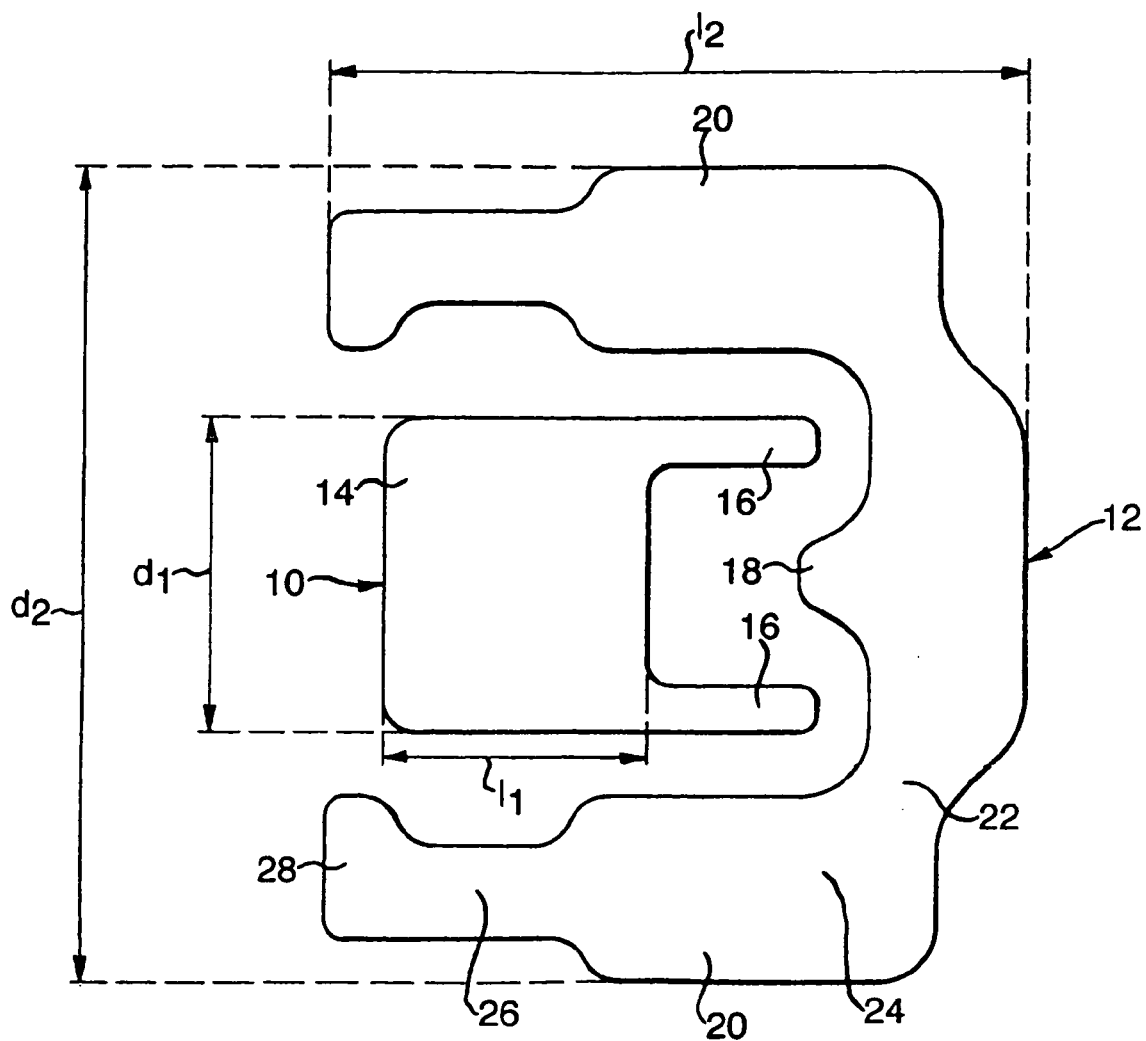
FIG. 1 is a plan view of two sensor mats according to the invention.

FIG. 1 shows a plan view on to a device for recognizing the occupancy of a seat comprising an inner sensor mat 10 of closed surface area surrounded by an outer sensor mat 12. In plan view the outer sensor mat 12 exhibits substantially the shape of a U while the inner sensor mat 10 possesses a rectangular, approximately square section 14 amounting to approximately 85% of its total area. From two opposite sides of the section 14 project two arms 16 in the direction of the base of the outer mat 12, wherein the two arms 16 extend away from two opposite, shorter sides of the rectangular section 14 and as a result point towards the base of the U of the outer mat 12.

In the region located between the two arms 16 the outer mat 12 possesses a projection 18 of approximately trapezoidal construction projecting in between the arms 16.

The side legs 20 of the U-shaped outer mat 12 begin starting from the base of the U at a slightly tapering section 22 and are widened in a section 24 located adjacent to the arms 16 of the inner mat 10. In an adjoining section 26 the two legs 20 of the outer mat 12 possess recesses both on the inside of the legs 20 and on the outside of the legs 20 which recesses are located at the level of the rectangular section 14 of the inner mat 10. This gives rise in turn to a slightly widened end section 28 of the legs 20.

In FIG. 1 the length of the legs 20 is designated by the reference symbol $l_2$ and the width of the base by the reference symbol $d_2$, whereas the length of the rectangular section 14 of the inner mat 10 is designated by $l_1$ and the width of this section 14 extending parallel to the base is designated by $d_1$. As can be seen the U-shaped outer mat 12 has a width $d_2$ which is approximately 2.5 times the width d1 of the rectangular section 14. The length 12 is approximately 2.5 times the length $l_1$ of the rectangular section 14. The length of the arms 16 of inner mat 10 is approximately 0.6 times the length l1 of the rectangular section 14. The area of the outer mat 12 is approximately 2.25 times the area of the inner mat 10.

Figure 2:
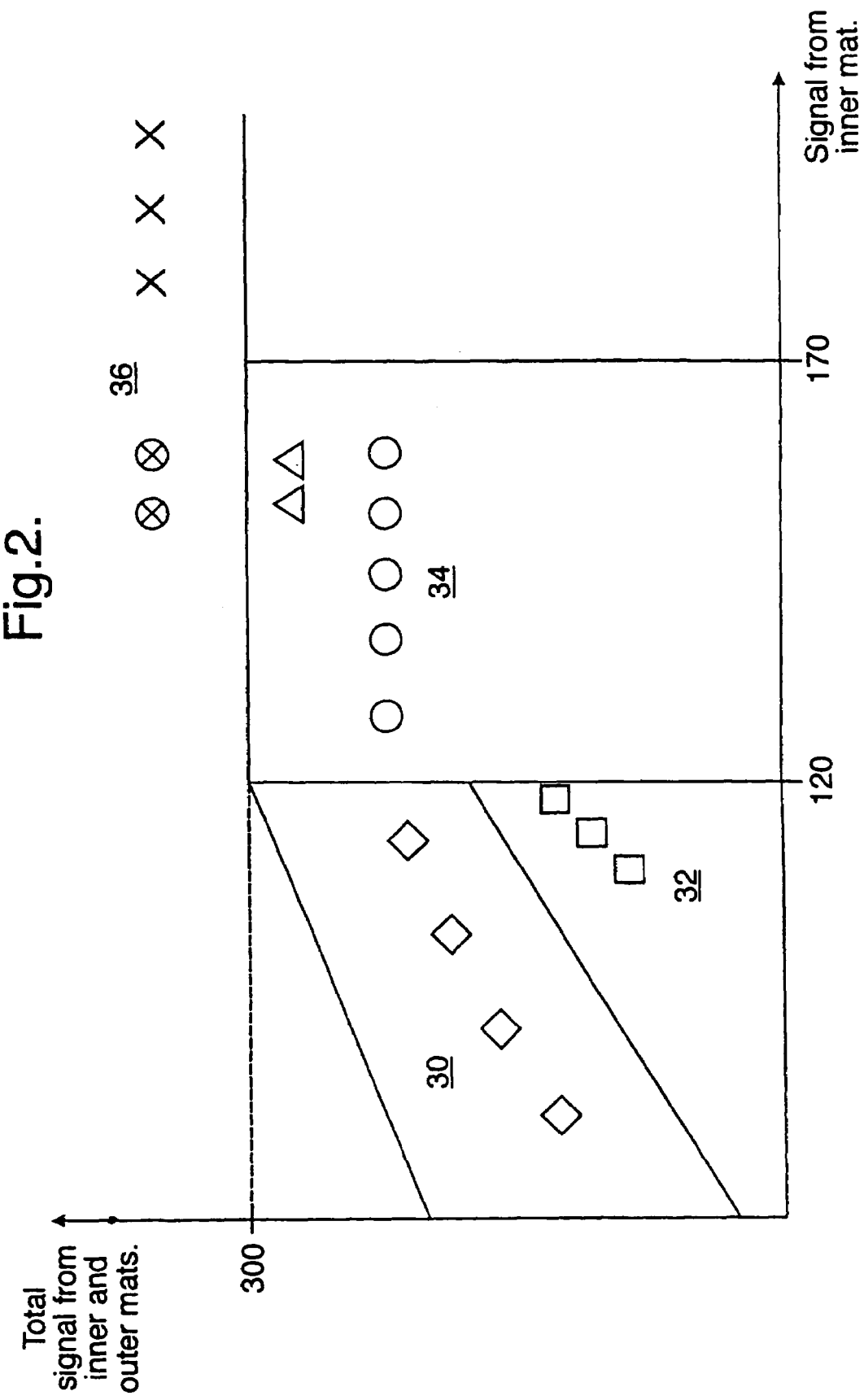
FIG. 2 is a graph in which pressure signals from the sensor mats of FIG. 1 are illustrated.

FIG. 2 illustrates the evaluation of signals from both mats 10 and 12.

The signal from the inner sensor mat 10 is plotted on the X axis and the sum of the signals from the inner sensor mat 10 and the outer mat 12 is plotted on the Y axis. By constructing regions 30, 32, 34, 36 the types of occupancy of the seat can be clearly distinguished, ie classified.

The diamonds in region 30 represent a child (approximately 12 months old) in a child's seat. In this case a good part of the signal comes from the outer sensor mat 12 because the child's seat is standing on runners which exert pressure on sections 24 26 and 28. On the other hand, due to its narrow hipbones an approximately six year-old child presses down almost exclusively on to the inner sensor mat 10 and, accordingly, is to be differentiated from the value range of the child's seat (square values in region 32). In a central region 34 is found the group of particularly light adults belonging to the so-called 5 per cent, ie to the 5% lightest of their gender. The circles in region 34 represent values for living persons and the triangles those of associated test dummies. The group of adults belonging to the 50th percentile whose weight is therefore the statistical median for their gender yields values in an upper region 36 of the graph in FIG. 2 (crossed circles: test dummies, crosses: living persons). If the sum of the signals from the two mats 10 and 12 yields a value of more than 300 (arbitrary units) a normal person of at least average weight is sitting on the seat.

Accordingly, the device according to the invention with two sensor mats and the method according to the invention for evaluating the signals from these two mats allows clear electronic recognition of different seat occupancy situations as required for controlling the deployment of air bags. The belt tension and acceleration sensors from the state of the art are no longer required. The entire system is simplified.

The invention claimed is:

1. A device for recognizing the occupancy of a seat in which for detecting a force acting on a seat surface a sensor installation is provided so that the force can be classified for recognition, characterised in that the sensor installation comprises two sensor mats which each independently of one another detect the pressure exerted on them, wherein said two sensor mats are juxtaposed and shaped to cooperatively encompass a substantial portion of the seat surface,
    wherein said two sensor mats comprise a generally U-shaped outer mat including a main portion and two spaced leg portions extending therefrom, and a generally U-shaped inner mat including a generally square main portion and two spaced arm portions extending therefrom towards the main portion of said outer mat.

2. The device according to claim 1, characterised in that the sensor mats are interlocked in one another.

3. The device according to claim 1, characterised in that in plan view one sensor mat is located inside the other sensor mat.

4. The device according to claim 1, wherein the inner mat has a substantially closed surface area and is surrounded by the outer mat in semicircular manner.

5. The device according to claim 4, wherein the outer mat has an area approximately 1.5 times to 2.5 times the area of the inner mat.

6. A method for recognizing the occupancy of a seat in which:
    two sensor mats located in the seat each emit a pressure signal, wherein said two sensor mats are iuxtaposed and shaped to cooperatively encompass a substantial portion of the seat,
    wherein said two sensor mats comprise a generally U-shaped outer mat including a main portion and two spaced leg portions extending therefrom, and a generally U-shaped inner mat including a generally square main portion and two spaced arm portions extending therefrom towards the main portion of said outer mat; and
    the pressure signals are evaluated singly.

7. The method according to claim 6, in which the pressure signal from said inner sensor mat and the sum with the signal from said outer sensor mat surrounding the former in the shape of a U is used.

8. The method according to claim 6, wherein the sum of the pressure signals is used for evaluation.

9. The method according to claim 6, wherein the difference between the pressure signals is used for evaluation.

10. A device for recognizing the occupancy of a seat in which for detecting a force acting on a seat surface a sensor installation is provided so that the force can be classified for recognition, characterized in that the sensor installation comprises two sensor mats which each independently of one another detect the pressure exerted on them,
    wherein said sensor mats are characterised by an inner and an outer sensor mat, wherein the inner mat has a substantially closed surface area and is surrounded by the outer mat in semicircular or U-shaped manner including a main portion and two spaced leg portions extending therefrom, wherein said inner mat is generally U-shaped, having a square main portion and two spaced arms extending therefrom towards the main portion of the outer mat, and wherein said outer mat leg portions and inner mat arms are substantially parallel and extend in opposed directions.

11. The device according to claim 10, characterised in that the outer mat possesses a preferably triangular or trapezoidal projection projecting between the arms of the inner mat.

12. The device according to claim 10, characterised in that the legs of the outer mat where they surround the arms of the inner mat have a greater width of leg than where they surround a rectangular section of the inner mat, wherein preferably the end section of the legs is again widened.

13. The device according to claim 10, characterised in that the sensor mats are interlocked in one another.

14. The device according to claim 10 characterised in that in plan view one sensor mat is located inside the other sensor mat.

15. The device according to claim 10, wherein the outer mat has an area approximately 1.5 times to 2.5 times the area of the inner mat.

\* \* \* \* \*